| [72] | Inventor | John B. Schutt |
| --- | --- | --- |
| | | Silver Spring, Md. |
| [21] | Appl. No. | 700,040 |
| [22] | Filed | Jan. 24, 1968 |
| [45] | Patented | Nov. 16, 1971 |
| [73] | Assignee | The United States of America as represented by the Administrator of the National Aeronautics and Space Administration |

[54] POTASSIUM SILICATE-ZINC COATINGS
2 Claims, No Drawings

[52] U.S. Cl. ............................................. 106/84
[51] Int. Cl. ............................................. C09d 1/02, C09d 1/04
[50] Field of Search ................................. 106/84, 84 M

[56] References Cited
UNITED STATES PATENTS

| 2,905,562 | 9/1959 | Brown | 106/74 |
| --- | --- | --- | --- |
| 3,423,229 | 1/1969 | Kompanek et al. | 106/84 M |
| 3,493,401 | 2/1970 | Schutt et al. | 106/84 |

Primary Examiner—James E. Poer
Attorneys—R.F. Kempf, E. Levy and G. T. McCoy

ABSTRACT: A zinc dust formulation for steel and the like utilizing as a vehicle a potassium silicate solution having a $SiO_2/K_2O$ ratio of about 4.8 to 5.3, said composition being resistant to abrasion and not subject to cracking and crazing during drying and preferably containing methyltrimethoxysilane to enhance these properties.

POTASSIUM SILICATE-ZINC COATINGS

SUMMARY OF DISCLOSURE

This invention relates to improvements in coating compositions utilized to form protective coatings on metals, preferably steel, and other surfaces. More particularly, the invention relates to coating compositions containing zinc dust carried in a silicate vehicle. Specifically, this invention is directed to zinc dust formulations wherein potassium silicate solution is the vehicle and wherein the ratio of silica to potassium oxide is critically controlled.

The desirability of utilizing zinc dust in formulations for metal coatings has led to the development of numerous vehicle systems, each intended to solve the myriad of problems encountered with attempting to adhere such a material to the base metal. Particularly vexing is the problem of uniform adherence both before and after baking, but other problems such as cracking, crazing, weather wearing and fire resistance are also usually encountered. The last of these problems may only be solved completely by inorganic vehicles, but by so doing the other problems are compounded, since inorganic coatings are notoriously poor in finish characteristics.

The prior art is replete with suggestions of inorganic materials which are stated to solve all of the noted problems. Generally, the solution is stated to lie in utilizing an alkali metal silicate solution vehicle. Specific formulations suggested propose the use of sodium silicate or potassium silicate in such solutions wherein the mole ratio of sodium oxide ($Na_2O$) or potassium oxide ($K_2O$) to silica ($SiO_2$) is greater than the normal 1:2, preferably being between 1:2.3 and 1:3.0. Even with these modifications in component ratios, the prior art requires that additive components be incorporated into the composition to provide or enhance the requisite properties. In this latter class fall such materials as lead chromate, which is intended to render the coating insoluble or ammonia or a fatty acid for spreadability and adhesion. Further suggestions include overcoatings with acids to insure neutralization particularly when corrosive environments are encountered.

None of these proposals or others too numerous to discuss have proved totally satisfactory; the principal problem being that each time a new material is added to solve one problem, it appears to accentuate another.

It is, therefore, the object of the instant invention to provide a zinc dust vehicle which is predominantly one material and which, when dried and/or baked, is not subject to problems of cracking or crazing.

It is also an object of the instant invention to provide such a vehicle which is both fire retardant while maintaining excellent adherence even when subjected to weathering or corrosive environments.

Additional objects will become apparent from the following detailed description and claims.

The instant invention it its broadest aspect involves the discovery that potassium silicate is effective as a binder in zinc dust formulations, its solution serving as an excellent vehicle for the zinc dust provided the mole ratios of silica to potassium oxide are maintained at a high level, preferably at the range of 4.8:1 to 5.3:1. These ranges far exceed normal commercial ratios which peak at about 3.3:1 and which, it has been found, are totally ineffective for the above purposes. The preferred ratios of silica to potassium oxide are essential to the development of a satisfactory coating, ratios less than those noted providing a coating subject to cracking and crazing upon heat application or air aging. Ratios higher than those noted are possible but do not provide improved results since such appear dependent upon complete hydration of the silica in solution and additional silica will obviously be in such condition due to the minimized potassium oxide. The coating composition of the instant invention is generally prepared utilizing preferably a solution containing 19 to 23 parts by weight potassium silicate. Such solution may be designated 19-23K 4.8-5.3; the 19-23 representing the percentage of solids in solution; the 4.8-5.3 representing the mole ratio of silica to potassium oxide; and K representing the potassium silicate.

Zinc dust is the other requisite compound of the composition and may be present in a broad range of amount based on the potassium silicate solution of from about one to six times the percent by weight of the latter (6-27 times the percent by weight silicate solids). The particular size particles of zinc dust also are not critical, although it is preferred to utilize particles smaller than 50 microns and more preferably smaller than 3 microns.

To this basic mixture lower alkyl lower alkoxysilane, preferably methyltrimethoxysilane may be added in amounts up to 3 percent by weight based on the total mixture in order to provide better adherence to steel substances due to more uniform dehydration. The lower alkyl groups may contain up to eight carbon atoms, but as indicated, the methyl being preferred due to its relatively lower expense and ease of availability.

The composition of the instant invention may also contain compatible fillers and dyes for standard extension and identification, the only criteria for addition of these components being that they do not affect the characteristics required.

The substrates to which the compositions of the instant invention are applied are generally metallic. Steel is of prime importance as the base to be treated. In such applications, the steel is first subjected to cleaning with phosphoric acid or sand blasting. The coating may be applied by all conventional techniques, spraying being preferred for obtaining a uniform application.

Having described the general details of the invention, the following table summarizes the preferred formulations encompassed therein.

| Component | Range-% by Weight |
|---|---|
| Potassium silicate sol. 19-23K4.8-5.3 | 17.6–41 |
| Methyltrimethoxysilane | 0.0–3 |
| Zinc dust | 56.0–82 |

Following are specific formulations made in accordance with the instant invention.

EXAMPLE I

| Component | Parts by Weight | % by Weight |
|---|---|---|
| Potassium silicate sol. 20K5.3 | 64.5 | 21.0 |
| Methyltrimethoxysilane | 2.0 | 0.6 |
| Zinc dust | 240.0 | 78.4 |
| | 306.5 | 100.0 |

(After 4 hours air drying, the coating was assayed at 94.4 % Zn + silicone)

EXAMPLE II

| Component | Parts by Weight | % by Weight |
|---|---|---|
| Potassium silicate sol. 22K4.8 | 64.5 | 26 |
| Zinc just | 180.0 | 74 |
| | 244.5 | 100 |

EXAMPLE III

| Component | Parts by Weight | % by Weight |
|---|---|---|
| Potassium silicate sol. 20K4.8 | 64.5 | 21.2 |
| Zinc dust | 240.0 | 78.8 |
| | 304.5 | 100.0 |

EXAMPLE IV

| Component | Parts by Weight | % by Weight |
|---|---|---|
| Potassium silicate sol. 22K4.8 | 64.5 | 21.2 |

| | | |
|---|---|---|
| Methyltrimethoxysilane | 2.0 | 0.6 |
| Zinc dust | 240.0 | 78.2 |
| | 306.5 | 100.0 |

EXAMPLE V

| | | |
|---|---|---|
| 20K5.3 | 64.5 | 21.2 |
| Zinc dust | 240.0 | 78.8 |
| | 304.5 | 100.0 |

EXAMPLE VI

| | | |
|---|---|---|
| Potassium silicate sol. 19K5.3 | 64.5 | 17.6 |
| Zinc dust | 300.0 | 82.0 |
| Methyltrimethoxysilane | 2.0 | 0.4 |
| | 366.5 | 100.0 |

Each of the above formulations was sprayed on steel surface, air dried at ambient temperature for 4 hours and visually and microscopically examined. In each case a firm adherent film was produced. The compositions containing the methyltrimethoxysilane appeared slightly more adherent when subjected to scraping tests and evidenced a more glossy finish.

The following is a summary of the formulations taught by Examples I–VI:

| Component | Range–% by weight |
|---|---|
| Potassium silicate solution (of 19–22% solids and SiO$_2$/K$_2$O mole ratio of 4.8 to 5.3) | 17.6–26 |
| Zinc dust | 74–82 |
| Methyltrimethoxysilane | 0–0.6– |

Although the composition of this invention is described with reference to preferred embodiments thereof, it will be apparent from the foregoing description that numerous variations and modifications can be made in the composition without departure from the invention, and it should be understood that the scope of the invention is limited only by the appendant claims:

What is claimed is:

1. A zinc dust formulation for protecting steel and the like consisting essentially of about 17.6–26 percent by weight of potassium silicate solution of about 19–22 percent solids and having a SiO$_2$/K$_2$O mole ratio of about 4.8 to 5.3 and about 74–82 percent by weight of finely divided zinc particles.

2. The zinc dust formulation in accordance with claim 1, wherein methyltrimethoxysilane is present in an amount of up to 0.6 percent by weight based on the weight of the total formulation.

* * * * *